(12) United States Patent
Agrawal (10) Patent No.: US 8,396,866 B2
(45) Date of Patent: Mar. 12, 2013

(54) MATCHING REVIEWERS TO REVIEW OBJECTS (75) Inventor: Sanjay Agrawal, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 108 days.

(21) Appl. No.: 12/963,232

(22) Filed: Dec. 8, 2010

(65) Prior Publication Data

US 2012/0150851 A1    Jun. 14, 2012

(51) Int. Cl.
*G06F 7/00* (2006.01)
(52) U.S. Cl. ....................................... 707/723
(58) Field of Classification Search ............ 707/723
See application file for complete search history.

(56) References Cited

U.S. PATENT DOCUMENTS

| | | | |
|---|---|---|---|
| 7,099,847 | B2 | 8/2006 | Darling |
| 7,236,932 | B1 | 6/2007 | Grajski |
| 2008/0040355 | A1* | 2/2008 | Martinez et al. ............. 707/10 |
| 2009/0119258 | A1 | 5/2009 | Petty |
| 2009/0265229 | A1* | 10/2009 | Sidhu .......................... 705/14 |

FOREIGN PATENT DOCUMENTS

| | | |
|---|---|---|
| WO | WO0065463 | 11/2000 |
| WO | WO2010036467 | 4/2010 |

OTHER PUBLICATIONS

Automatic Topics Identification for Reviewer Assignment—Published Date: Mar. 9, 2007.
Mapping the Bid Behavior of Conference Referees—Published Date: Jan. 2007.
Improving Scientific Conferences by Enhancing Conference Management System with Information Mining Capabilities—Published Date: Dec. 6, 2006.
Assigning Papers to Referees—Published Date: Sep. 2010.
Using Publications and Domain Knowledge to Build Research Profiles: An Application in Automatic Reviewer Assignment—Published Date: Mar. 9, 2007.

* cited by examiner

Primary Examiner — Truong Vo (57) ABSTRACT

Techniques are described for incorporating different types of input available to administrators responsible for assigning reviewers (persons) to objects to be reviewed. A plurality of types of assignment ranking algorithms is provided. Each ranking algorithm can output a different set of candidate assignments (reviewer-review object pairs) with corresponding ranks/weights (measures of how well object fit reviewers). Some ranking algorithms may automatically generate assignments by using information about review objects and reviewers to find matches therebetween. Other algorithms might simply rank or weigh suggested matches (e.g., from manual input). The ranked/weighted assignments from the various algorithms are combined to produce a final result set of suggested assignments of reviewers. In one embodiment, a bidding algorithm, referral algorithm, and a relevance algorithm may be used, and intermediate results therefrom are combined for a final result.

17 Claims, 6 Drawing Sheets

| Auto Assignments Wizard |
|---|

| select papers | min reviewers for papers | select reviewers | max papers for reviewers | configuration summary |

| Step 5: Assignment configuration summary |
|---|

Weights: Automatic assignment algorithm uses reviewers bids, candidates suggestions, and subject area relevance to suggest assignments. By default, it uses all three above and assigns certain weights to these. You may use your custom weights (between 0 and 1) for these as selecting wehther to use bids, suggestions, or relevance and corresponding weights may affect the final assignment results.

● Default
○ Custom
 ☐ Bids        ____________
 ☐ Suggestions    ____________
 ☐ Relevance     ____________

Minimum Number of Assignments
 ● Default 0 minimum (Load balanced)
 ○ Custom [0]

[ Export Data for Custom Assignment ]   [ Run Automatic Assignments ]

MATCHING REVIEWERS TO REVIEW OBJECTS

BACKGROUND

Often a set of persons with expertise in subject matter, for example reviewers, need to be matched with or assigned to objects related to the subject matter, for examples paper submissions or proposals. In the case of peer reviewed journals or conferences, the process of assigning reviewers to submissions is a time consuming part of the reviewing workflow. Specifically, for the assignment of reviewers to paper submissions in an automated conference management service, it is important to correctly identify reviewers who can serve as expert reviewers for a given submission (that is, expertise of a reviewer matches well to a submission). In such cases, it is important to have good measures to effectively capture the match between a submission and a reviewer. Such measures can be used by a program administrator (e.g., a chairperson) to manually assign submissions to reviewers manually, or the measures may be used to automatically assign reviewers (or a combination of both).

While manual refining of such assignments has been commonly practiced, automating assignment suggestions can be helpful in cases with complex workflows or large number of submissions and reviewers, as well as in the presence of constraints that are typical in such scenarios. Some examples of common constraints include: each submission must have at least some minimal number of reviewers; a reviewer can be assigned no more than a certain maximum number of submissions that make performing assignments a significantly harder. Therefore, integration and customization of such measures can be effective in the assignment process. Today there are several different mechanisms that are used to capture the match between a submission and a reviewer. However, each has limitations and advantages that may vary according to circumstances. There has not previously been any attempt to integrate different ranking methods or to allow a ranking process to be extended to include new types of ranking methods. Techniques related to matching reviewers with review objects are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques are described for incorporating different types of input available to administrators responsible for assigning reviewers (persons) to objects to be reviewed. A plurality of types of assignment ranking algorithms is provided. Each ranking algorithm can output a different set of candidate assignments (reviewer-review object pairs) with corresponding ranks/weights (measures of how well object fit reviewers). Some ranking algorithms may automatically generate assignments by using information about review objects and reviewers to find matches therebetween. Other algorithms might simply rank or weigh suggested matches (e.g., from manual input). The ranked/weighted assignments from the various algorithms are combined to produce a final result set of suggested assignments of reviewers. In one embodiment, a bidding algorithm, a referral algorithm, and a relevance algorithm may be used, and intermediate results therefrom are combined for a final result.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to finding assignment information that indicates which reviewers are suitable to which review objects. As used herein, reviewers are understood to be any persons that are to be considered as potentially suitable to review a review object. A review object can be anything that a reviewer might offer an opinion on, scrutinize, provide feedback about, test, or otherwise give consideration. Examples include but are not limited to: products, documents, journal or conference submissions, services, requests for proposal, etc.

Various embodiments allow different types of input data to be taken into account when generating a numeric score that measures the quality or suitability of a match between a review object and a reviewer. Such score generation mechanisms can be customized and extended to include additional types of input. Further the score can be used to easily manually identify a final set of reviewers for a submission (and vice versa) and can be easily integrated into existing automatic assignment algorithms to help program administrators assign reviewers to review objects.

Explanation will proceed with an overview of the general idea of assigning reviewers to review objects. An example infrastructure to support assignment scoring is described next. A user interface is described briefly to help understand how a program administrator can interact with embodiments described herein. A process for integrating three different scoring techniques is then discussed.

Figure 1:
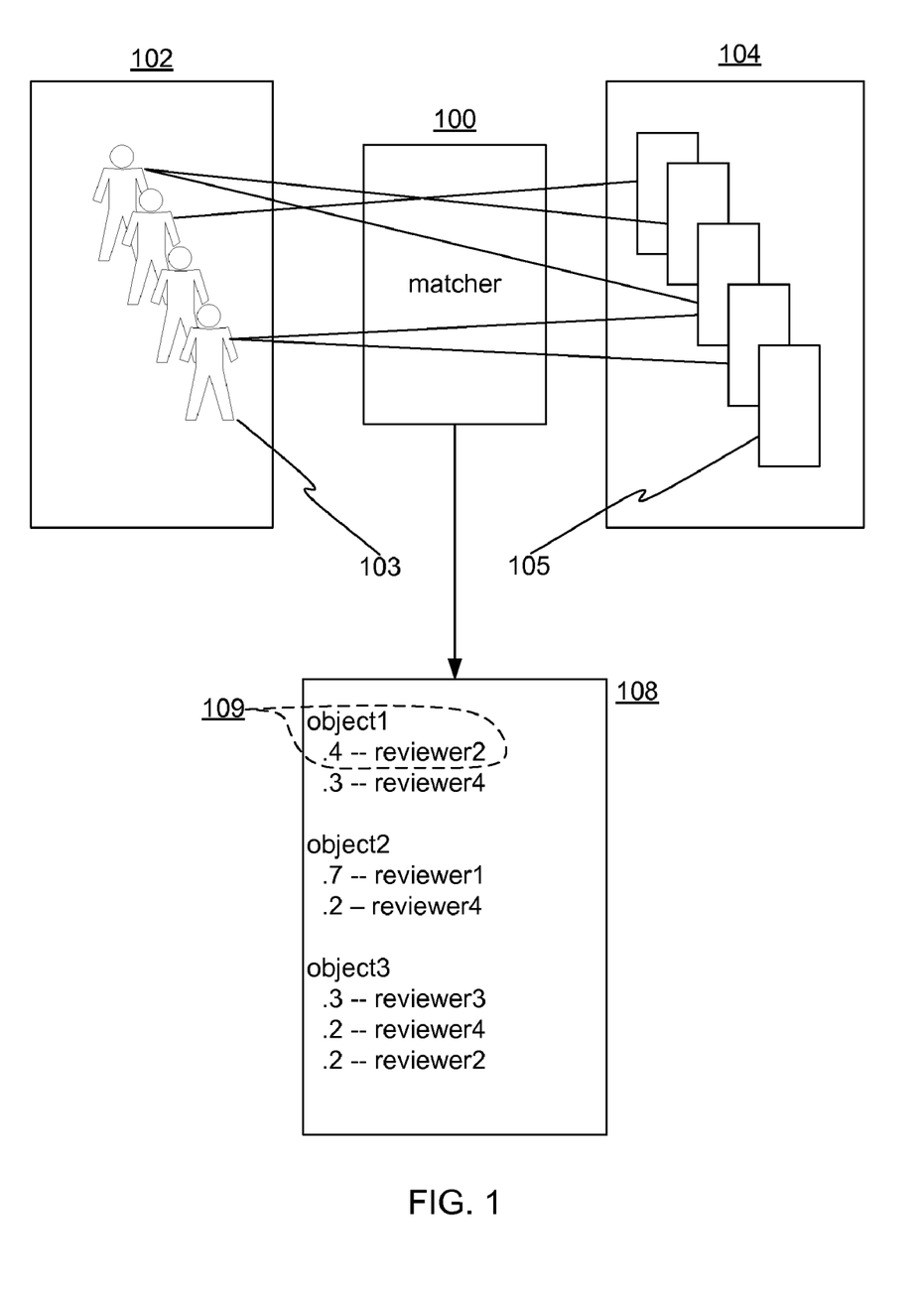
FIG. 1 shows a matcher for matching reviewers with review objects.

FIG. 1 shows a matcher 100 for matching reviewers 102 with review objects 104. Details of various embodiments of matcher 100 will be described below. A set of reviewers 102 are provided as input to the matcher 100. For convenience, according to context, "reviewer" will be used herein to refer both a human reviewer and to an electronic or digital record or other form of computer-stored information that represents a human reviewer. As mentioned, a reviewer 103 is a person presumably potentially suitable for reviewing a review object. A review object 105 will be used herein, according to context, to refer to both an actual object to be reviewed (e.g., a paper or product) as well as an electronic or stored digital record representing an actual review object. A review object record need not include the actual data that it represents (e.g., a document), but rather will have various fields and pieces of information related to the represented review object that can be used for matching, for example, categories of the review object, data describing the review object, a unique identifier, and so on.

The matcher 100 is a component, running on one or more computers, that receives various inputs, including reviewers 102, review objects 104, and other inputs to be described later, but perhaps including input for different types of matching algorithms (sub-modules of the matcher 100 component). The matcher 100 analyzes the inputs and computes as output 108 a ranking of candidate reviewers for as many review objects as possible. For example, object1 may have reviewer2 as a top candidate (that is, pairing 109 has rank .4) and reviewer4 as a second best candidate (rank .3). The output 108 can take a wide range of forms, but functionally it should map review objects to reviewers with information indicating which reviewers have been determined by the matcher 100 to be suitable to which review objects, and possibly with some degree of confidence, weight, ranking number, etc.

Figure 2:
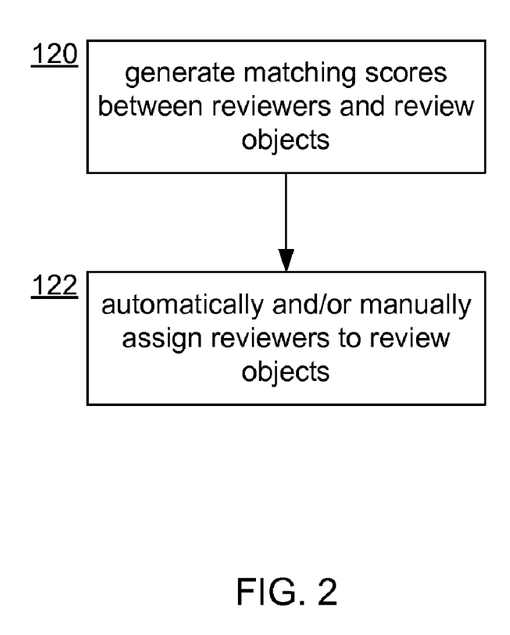
FIG. 2 shows a general process corresponding to FIG. 1 for matching reviewers to review objects.

FIG. 2 shows a general process corresponding to FIG. 1 for matching reviewers to review objects. The matcher 100 may perform step 120 by generating matching scores between reviewers 102 and review objects 104. In particular, information about the review objects and the reviewers is passed to different types of matching or ranking modules which implement respective different types of matching or ranking models. Note that a module may generate matches and/or may rank matches; for short, modules will be referred to as ranking modules, although it should be understood that some such modules may also perform matching. A ranking module may perform its own matching and generate its own sub-results. The sub-results are then combined to form a final result set at output 108. Given output 108, actual assignment of reviewers to review objects is then performed at step 122. This step can involve automatic assignment based on the output 108, manual assignment by an administrator as informed by the output 108, or a hybrid of manual and automatic assignment (e.g., assignments above a threshold rank in output 108 are made automatically, and those below the threshold are made manually).

Figure 3:
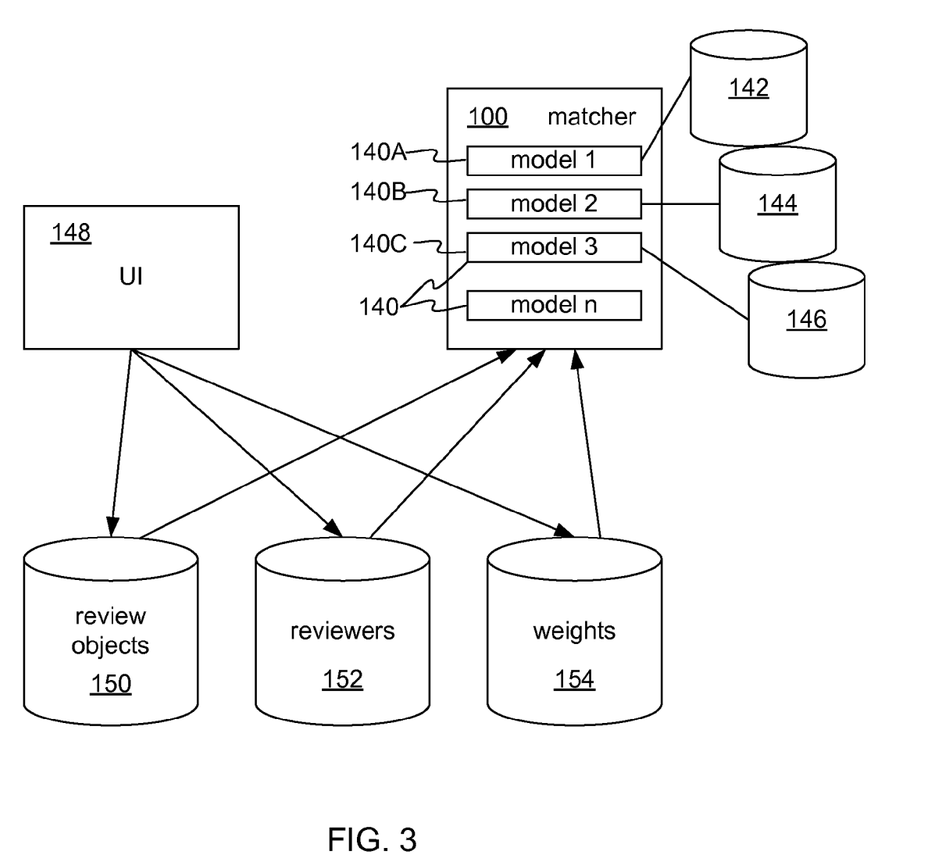
FIG. 3 shows an arrangement of components for performing multiple types of assignment rankings.

FIG. 3 shows an arrangement of components for performing multiple types of assignment rankings. Matcher 100 may include multiple ranking modules 140. Each ranking module 140 implements a different model for ranking assignments between review objects and reviewers. In one embodiment, the ranking modules 140 include a bid ranking module 140A (e.g., model 1), a referral ranking module 140B (e.g., model 2), and a relevancy ranking module 140C (e.g., model 3). These specific ranking modules 140 are discussed next. Each of these ranking modules 140 may access, respectively, bid data 142 in a data store, referral data 144 in another data store, and relevancy data 146 in another data store. It should be noted that any type of ranking model can be implemented in a ranking module 140. Moreover, new ranking modules can be added.

The bid ranking module 140A may implement a bidding or self-selection model where reviewers themselves provide information about preferences for review objects. This type of model has—by itself—been used previously and additional details may be found elsewhere. In brief, however, program administrators (those administering reviewer assignments) can request reviewers to enter their bids for submitted review objects to indicate their preference for reviewing a review object. This typically involves reviewers interacting with a graphical user interface (GUI) to peruse a list of available review objects, decide which review objects match their expertise, and formulate bids for review objects. Bids are entered accordingly by the reviewers and stored, for example, in the bid data 142. A bid may take many forms, such as a simple link between a reviewer and a review object, a weight or category (e.g., high/medium/low, or a number from 0 to 1, etc.). Reviewers may bid on more than one review object. Because the reviewers provide this information directly, and because a bid may constitute fine-grained information about the corresponding review object, when present, a bid may be a reliable indicator of how well a reviewer matches a review object. However in practice, in many large conferences where paper submissions are the review objects, bid data may unavailable or sparse, i.e., few reviewers may provide bids for submissions or there may be many submissions that receive no bids at all.

The referral ranking module 140B may generate assignment rankings based on referral data 144. With this type of ranking model, program administrators request third party users who are experts in areas (typically referred to as "area chairs" in conferences) to suggest reviewers for review objects, preferably (make referrals) in a ranked manner, as possible matches for a review object. Alternatively, experts may provide a weight or a score for a reviewer and a review object as a measure of the match between the corresponding reviewer and a review object. In larger conferences, program administrators may designate selected experts (which may or may not be reviewers) and request them to suggest a best set of reviewers for review objects in their corresponding areas. This can ease the burden of program administrators trying to find the best set of reviewers for a review object by distributing the task. Because experts in an area generally know other expert reviewers in related areas, this may lead to reliable quality of assignments.

To facilitate the referral process, program administrators may request reviewers to provide their areas of expertise, which can be stored in referral data 144. As an example, a hierarchy or list of subject or expertise areas and sub-areas can be displayed and selections stored in the referral data 144. Note that area-of-expertise information may also be used or collected in connection with the bidding ranking module 140A or with other models to be used as complementary information. In addition to maintaining information about expertise of reviewers (e.g., mappings between reviewers and subject areas), review objects are tagged or associated with the subject areas that correspond to their subject matter or content. For example, a paper about database query engines might be tagged with "query optimization", "databases", etc. This allows straight-forward matching of reviewers with review objects.

Providing areas of expertise (to allow referrals) may in some circumstances be easier for reviewers compared to bidding, for example, when the number of areas of expertise is orders of magnitude smaller than number of review objects, or when the areas can be represented by small descriptors organized hierarchically thus making selection of such areas a simple task. Bidding, in some cases, may require reviewers to look at large amounts of data; e.g., submission abstracts are relatively large and time-consuming to read compared to smaller subject/expertise areas described by keywords.

The relevancy ranking module 140C can be implemented with any of a variety of existing relevancy-ranking algorithms. Generally, relevancy data 146 may store links to or information about individual review objects and reviewers (relevancy data 146 may simply be data from review objects 150 and reviewers 152). For example, keywords describing review objects and reviewers, external data such as papers written by reviewers, any of the bid data 142 or referral data 144, and so on. In one embodiment, the relevancy data 146 includes a list of relevant topics (possibly weighted/ranked)

for each review object, and a list of topics (possibly weighted/ranked) for each reviewer, and the lists are compared to find relevancies of assignments of reviewers to review objects. In one embodiment, exact matches are given higher relevance values than hierarchical matches, and matches between primary subject areas are given higher relevance values than matches between primary and secondary subject areas, which in turn have higher relevance values than secondary subject areas matches. In sum, regardless of the data and algorithms used, the relevancy ranking module 140C calculates matches between reviewers and review objects based on relevancy.

FIG. 3 also shows a user interface 148 (UI). The user interface 148 is used to enter or provide information about review objects 150, reviewers 152, and weights 154. As will be explained next, weights 154 are weights of the respective ranking modules 140. When intermediate assignment results from the ranking modules 140 are generated, the weights 154 determine how much weight (degree of influence) each intermediate result set will have when combined to produce a final result set.

Figure 4:
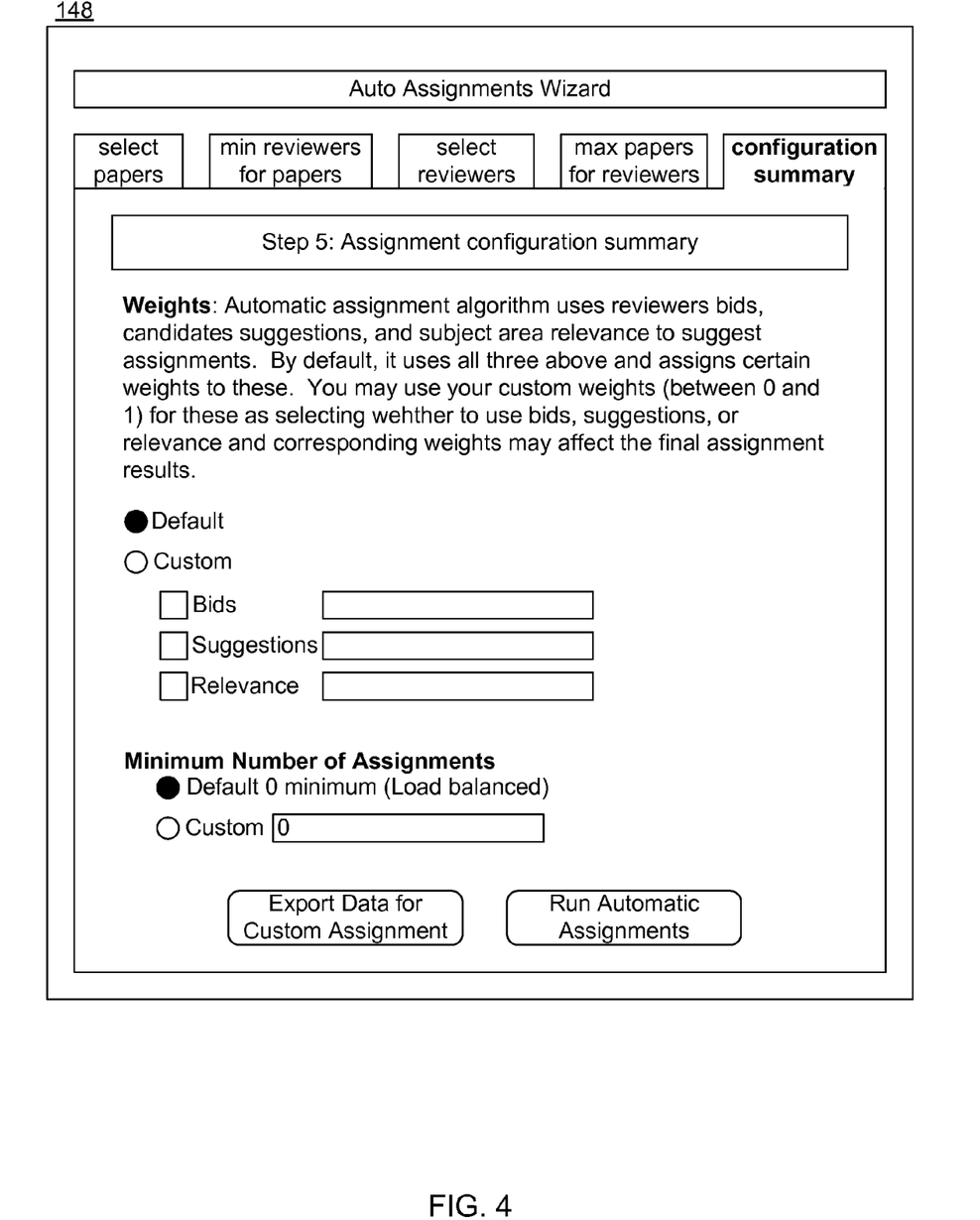
FIG. 4 shows a detailed view of a user interface.

FIG. 4 shows a detailed view of user interface 148. The user interface 148, for example, an application, web page, etc., can be used to override a default set of weights 154 to allow custom weighting of whichever ranking modules 140 are available. In the example of FIG. 4, the "Bids", "Suggestions", and "Relevance" entry areas correspond to the bid ranking module 140A, referral ranking module 140B, and the relevancy ranking module 140C, respectively. Note that the view in FIG. 4 is only the last of a five-stage process that can include selecting papers (review objects), providing a minimum number of reviewers, selecting reviewers, and entering a maximum number of reviewers.

Figure 5:
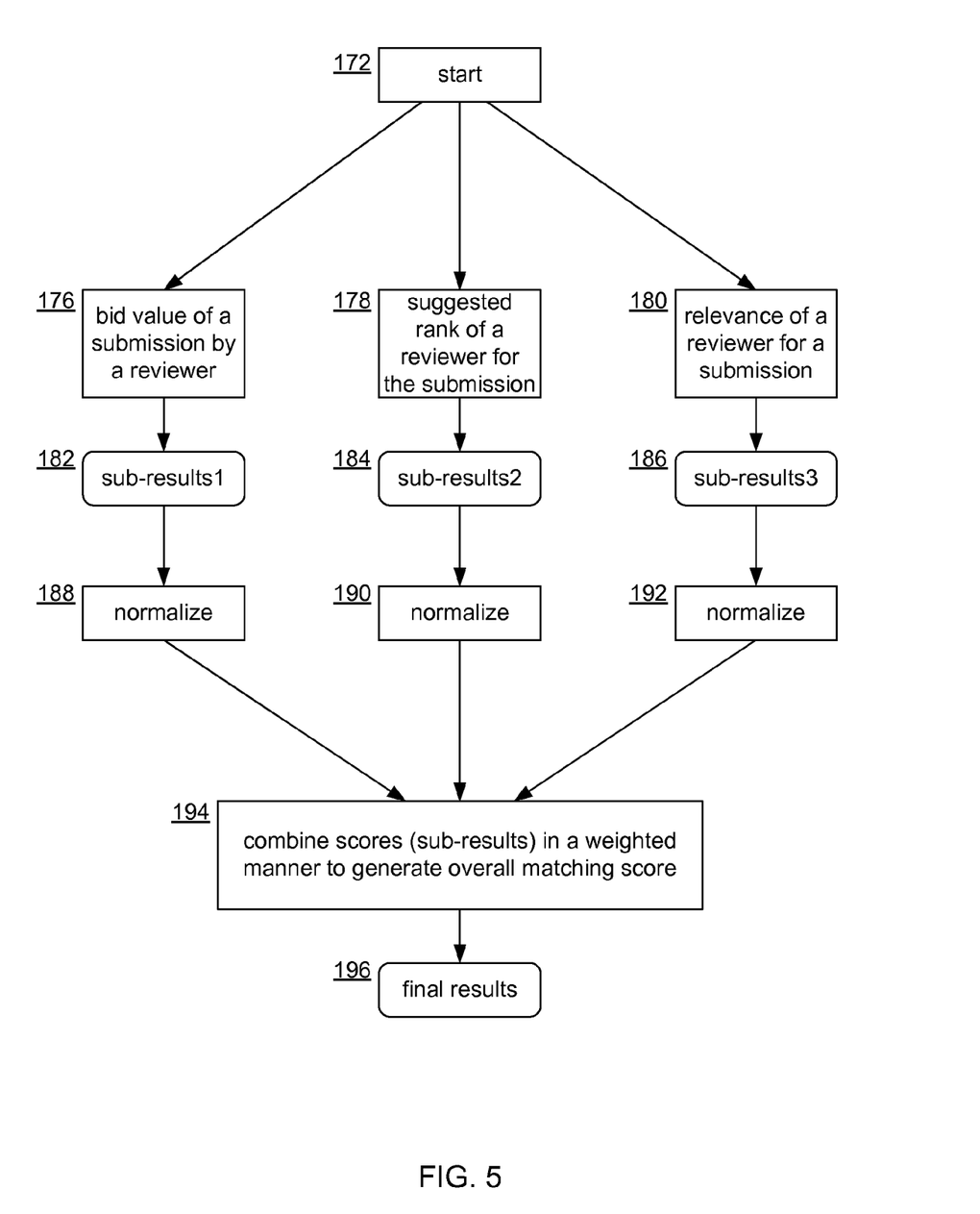
FIG. 5 shows a process for generating and integrating intermediate sub-results.

FIG. 5 shows a process for generating and integrating intermediate sub-results. At a starting step 172, different assignment ranking processes are performed. As discussed above, a bid ranking step 176 ranks object-reviewer assignments, a referral step 178 generates assignments (ranked/weighted) according to information about which reviewers have been referred to which review objects, and a relevancy ranking step 180 ranks assignments according to computed relevancies of reviewers to review objects. Each of steps 176, 178, and 180 generate respective intermediate sub-results 182, 184, 186. As noted above, any type of ranking model can be used at the steps that generate intermediate sub-results; the bid, suggestion/referral, and relevance models are only examples.

The bid intermediate sub-results 182 are normalized at step 188 by scaling bids so that, for each reviewer, the sum of all bids are equal to some constant. In other words, the sum of the normalized bids of reviewerA will be equal to the sum of the normalized bids of reviewerB. This allows differentiation of bids by reviewers who bid on few review objects as compared with other reviewers who bid on large numbers of review objects; bid values of reviewers with few bids gets inflated relative to bid values of reviewers with relatively many bids.

At step 190 the referral intermediate sub-results 184 (ranked suggestions) are normalized using a log function to assign a value. This allows more differentiation between higher ranked candidates than lower ranked candidates. For example, rank values between ranks 1 and 2 for a review object will have a larger difference than the difference between ranks 99 and 100.

At step 192, relevancy intermediate sub-results 186 are also normalized. Any known normalization technique can be used, for example sum of squared differences, etc.

Once the individual values of the intermediate sub-results 182, 184, 186 are calculated and normalized, they are combined at step 194 in a weighted manner using weights 154 to generate the final results 196 (e.g., scores) that are used for assignment. Available default weights can be selected so that if a bid value is provided by a reviewer for a review object, the combination of ranked value and relevance cannot exceed the bid value. Likewise if ranked value is present, the relevance value cannot exceed the ranked value. This can help to capture the default usage scenario that is attached to these different sources.

Figure 6:
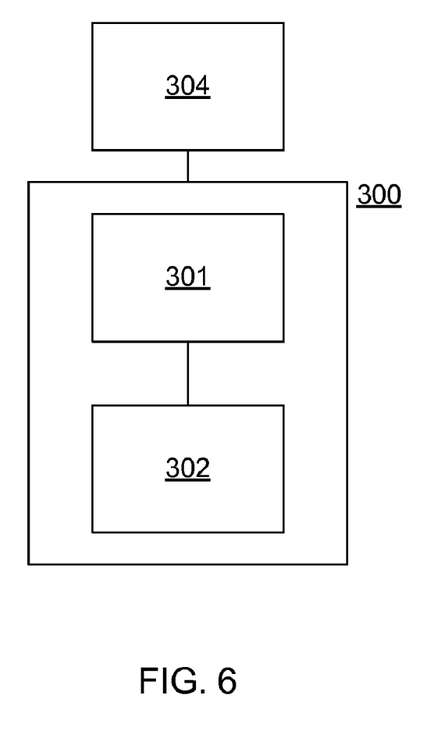
FIG. 6 shows a computer.

FIG. 6 shows a computer 300. Computer 300 may be any type of computing device, or virtual computing device (i.e., a virtual machine), and may have a processor 301 and storage 302. Output such as user interface 148 may be displayed on a display 304 connected with the computer 300. Embodiments and features discussed above can be realized in the form of information stored in volatile or non-volatile computer or device readable media, which may be the part of the computer 300 in the form of storage 302, or removable or external storage. This device readable media is deemed to include at least media such as optical storage (e.g., compact-disk read-only memory (CD-ROM)), magnetic media, flash read-only memory (ROM), or any current or future means of storing digital information in a form for ready reading and/or execution by a computer. The stored information can be in the form of machine executable instructions (e.g., compiled executable binary code), source code (whether interpreted, compilable, etc.), bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computer-implemented method of generating and storing assignment information, the method performed by a computing device comprising storage and a processor, the method comprising:
   accessing, by the computing device, a set of reviewers, each reviewer comprising a stored record representing a corresponding person;
   accessing, by the computing device a set of review objects, each review object comprising a stored record representing an object to be reviewed by one or more of the persons;
   receiving a request to match reviewers with review objects, and in response:
      accessing (i) a set of bids submitted by the persons corresponding to the reviewers, each bid comprising a value inputted by a corresponding person and representing that person's estimation of suitability to review a given review object, (ii) a set of suggestions, each suggestion comprising an association, inputted as a recommendation by a user, between a review object and a reviewer, and (iii) relevance information indicating automatically computed relevances of reviewers to review objects;
      generating, by the processor, a first result set from the set of bids, the first result set comprising first assignments between review objects and reviewers ranked according to the set of bids, generating, by the processor, a second result set from the set of suggestions, the second result set comprising second assignments between review objects and reviewers ranked according to the set of suggestions, and generating, by the processor, a third result set from the relevance information, the third result set comprising third assignments between review objects and reviewers ranked according to the relevances;

combining, by the processor, at least portions of the first result set, second result set, and third result set to form a final result set comprised of assignments from the first, second, and third result set, the assignments of the final result set ordered according to the rankings of the first, second, third, result set and ordered according to weights of the first, second, and third result set, respectively; and storing the final result set in the storage of the computing device.

2. A method according to claim 1, wherein the generating the third result set comprises using information about a given review object and information about a given reviewer to compute a specific rank or weight indicating how relevant the review object is to the reviewer, and the third result set is comprised of the specific rank or weight.

3. A method according to claim 1, further comprising normalizing the first result set, the second result set, and the third result prior to the combining.

4. A method according to claim 1, further comprising assigning the persons to review the objects based on the final result set.

5. A method according to claim 4, wherein the assigning is performed at least in part by an administrative user manually assigning persons to review objects.

6. A method according to claim 4, wherein the assigning is performed at least in part automatically based on the final result set.

7. One or more computer-readable storage media storing information to enable one or more computers to perform a process, wherein the computer-readable storage media is not a signal, the process comprising:

storing a plurality of review object records representing objects to be assigned reviewers that are persons, and storing a plurality of reviewer records representing the reviewers, respectively;

executing a first ranking module, the first ranking module implementing a first type of ranking model, the first ranking module generating and ranking, for the review object records and the reviewer records, a first set of assignments of reviewer records to review objects;

executing a second ranking module, the second ranking module implementing a second type of ranking model, the second ranking module generating and ranking, for the review object records and the reviewer records, a second set of assignments of reviewer records to review objects;

generating a third set of assignments by combining the first set of assignments and the second set of assignments; and storing the third set of assignments.

8. One or more computer-readable storage media according to claim 7, the combining comprising normalizing the first set of assignments, normalizing the second set of assignments, weighting each normalized set of assignments, and combining the weighted normalized sets of assignments.

9. One or more computer-readable storage media according to claim 8, wherein the first model comprises a bid model wherein the reviewer persons submit bids to review particular review objects and the first ranking module uses the bids to generate the first set of assignments.

10. One or more computer-readable storage media according to claim 9, wherein the second model comprises a referral model wherein third persons submit referrals referring reviewer persons, and the second ranking module uses the referrals to generate the second set of assignments.

11. One or more computer-readable storage media according to claim 7, wherein the review objects comprises papers submitted for peer review, the reviewer persons are persons with expertise in subject matter areas corresponding to subjects of the papers, and a reviewer person reviews a review object according to a corresponding assignment in the third set of assignments.

12. A computer comprising storage and a processor, further comprising:

a bid generating module, stored by the storage and executed by the processor, which reviewers of review objects interact with to submit bids of which review objects the reviewers are willing to review;

a bid ranking module, stored by the storage and executed by the processor, that ranks assignments of reviewers to review objects according to the submitted bids;

a relevance module, stored by the storage and executed by the processor, automatically matching, according to relevance of reviewers to review objects, reviewers with review objects, and weighting or ranking each match of a review object with a reviewer to reflect a degree of relevancy therebetween; and a combining module that combines the ranked assignments and the ranked matches to generate a final set of ranked assignments of reviewers to review objects.

13. A computer according to claim 12, further comprising a referral module that takes as input information indicating categories of subject matter expertise of each reviewer and information indicating categories of subject matter of the review objects, the referral module automatically finding and ranking correspondences of reviewers to review objects according to the input.

14. A computer according to claim 13, wherein the combining module further combines the ranked correspondences.

15. A computer according to claim 14, wherein the combining module weights the ranked assignments according to a first weight, weights the ranked matches according to a second weight, and weights the ranked correspondences according to third weight.

16. A computer according to claim 15, wherein the weights are entered manually by a user that administers the assigning of reviewers to review objects.

17. A computer according to claim 12, wherein the storage stores the final set of ranked assignments which are then used to generate actual assignments of reviewers to review objects, the actual assignments being stored in the storage.

* * * * *